April 22, 1969   R. F. J. BROOM   3,440,513
PULSE SUPPLY FOR LASER OPERABLE AT ROOM TEMPERATURES
Filed July 6, 1965   Sheet 1 of 3
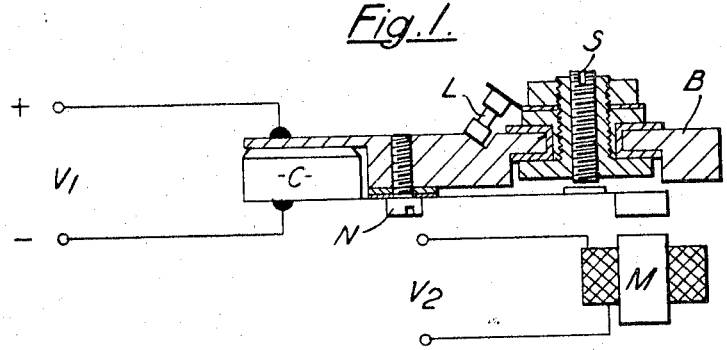
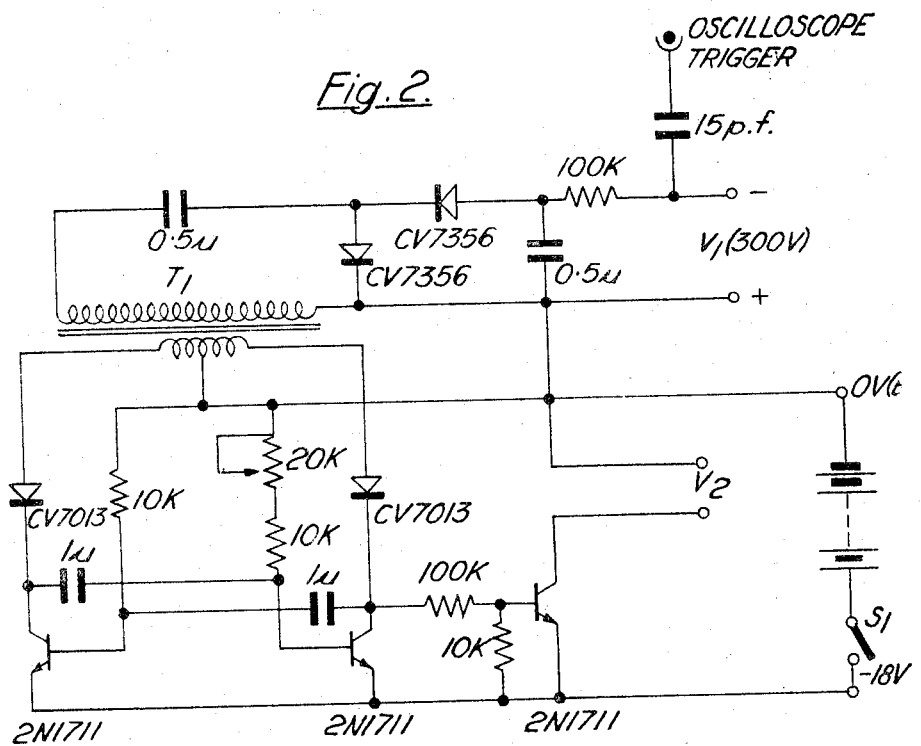
Inventor
Ronald Francis Johnston Broom
By Cushman, Darby & Cushman
Attorneys United States Patent Office 3,440,513
Patented Apr. 22, 1969

3,440,513
PULSE SUPPLY FOR LASER OPERABLE
AT ROOM TEMPERATURES
Ronald Francis Johnston Broom, Buntingford, England, assignor, by mesne assignments, to National Research Development Corporation, London, England, a corporation of Great Britain
Filed July 6, 1965, Ser. No. 486,580
Claims priority, application Great Britain, July 4, 1964, 27,661/64
Int. Cl. H02j 7/04; H01h 53/015
U.S. Cl. 320—1                    13 Claims

ABSTRACT OF THE DISCLOSURE

A pulse supply for lasers whereby the laser may be operated at room temperatures without the necessity of cooling the same to produce appreciable light emission therefrom; the laser being connected to low inductance capacitor means through a low inductance electrical path including switching means whereby the connection between the laser and said capacitor means may be rapidly made and broken repeatedly to discharge said capacitor means through said laser.

---

This invention relates to a drive for a laser, more particularly to a GaAs laser, whereby the laser may be operated without the necessity of cooling the same to produce appreciable light emission therefrom.

The threshold current for stimulated emission from GaAs lasers is between 20 and 30 times greater at 300° K. than at 77° K. For laser having a junction area of 0.4 mm. x 0.4 mm. the threshold current is, therefore, about 100 amps at 300° K., but in order to obtain the maximum light output the current must be at least five times this figure. The rate at which heat is generated in the junction is very much greater at 300° K. than at 77° K. and, as a consequence, the current pulse must have a very rapid rate of rise in order to overtake the simultaneously increasing threshold current. Heating of the junction also reduces the length of the light output pulse, present values being about 20 nanoseconds for a 500 amp pulse. Conventional methods of generating suitable drive pulses are based on coaxial lines discharged by means of a spark or by a mercury-wetted relay. The latter, because of its construction, will only operate satisfactorily with a line impedance between 50 and 100 ohms, so, in order to obtain high currents, it is necessary to use either very high voltages or to attempt the difficult problem of making a pulse transformer to match the line of the impedance of the laser, which is of the order of 0.1 ohm or less. Spark gaps will only operate at voltages greater than several kilovolts therefore with both types of conventional pulse generator there is a matching problem. In general the apparatus involved in these conventional pulse generators is bulky and wasteful of electrical power. Unfortunately, there is as yet no semi-conductor switch possessing both the required speed of operation and current carrying capacity.

The present invention is concerned with a drive for a laser which eliminates most of the problems associated with the conventional line type pulse generators.

According to the present invention an improved drive for lasers comprises means for repeatedly charging a low inductance capacitor together with means whereby the capacitor may be repeatedly discharged through the laser by means of mechanical contact.

Figure 3:
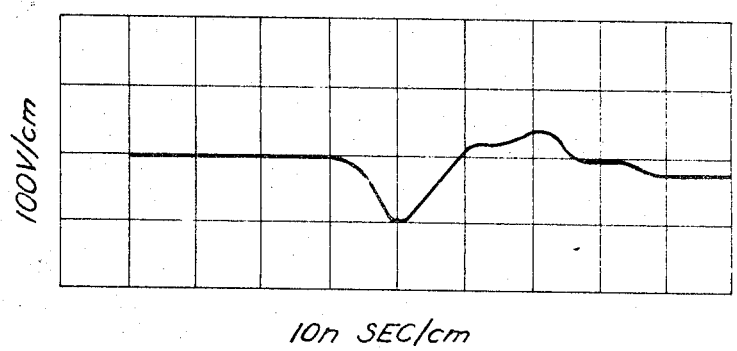
Figure 4:
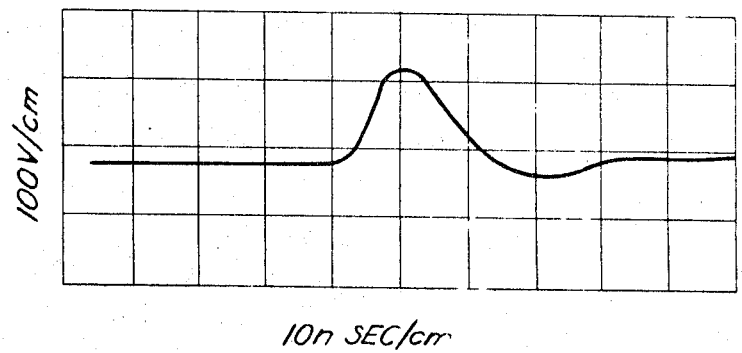
Figure 5:
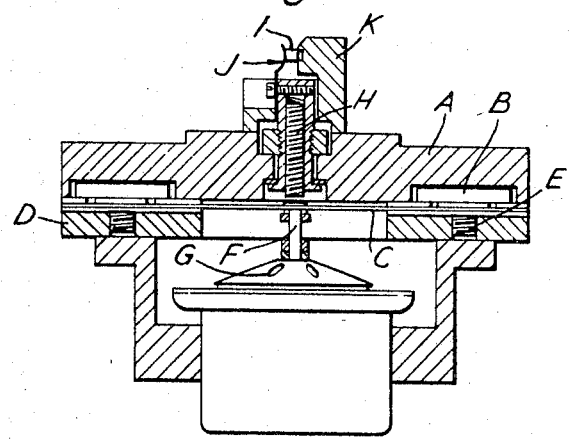
Figure 6:
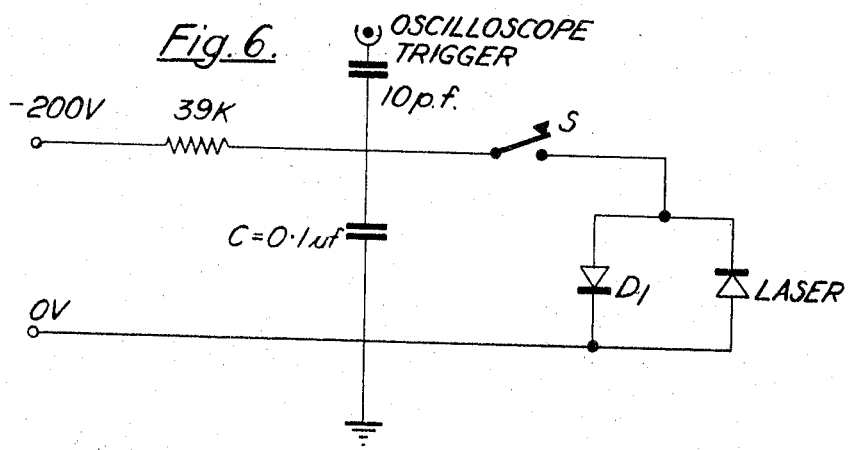
Figure 7:
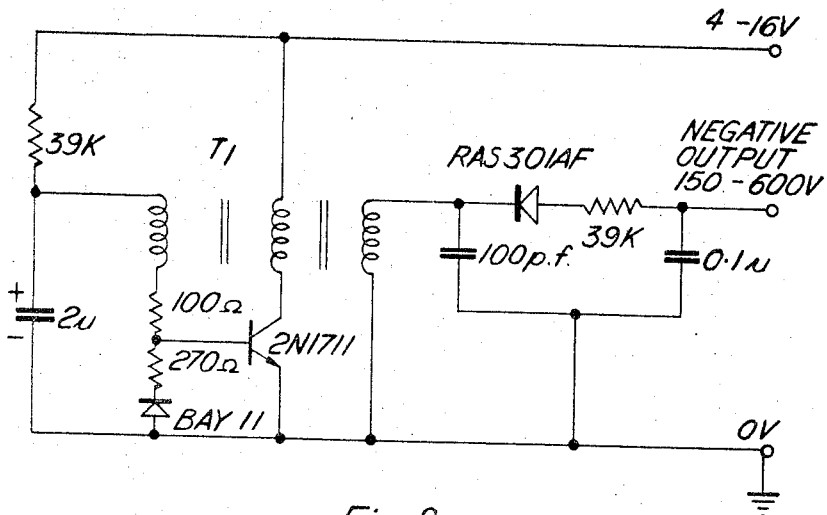
Figure 8:
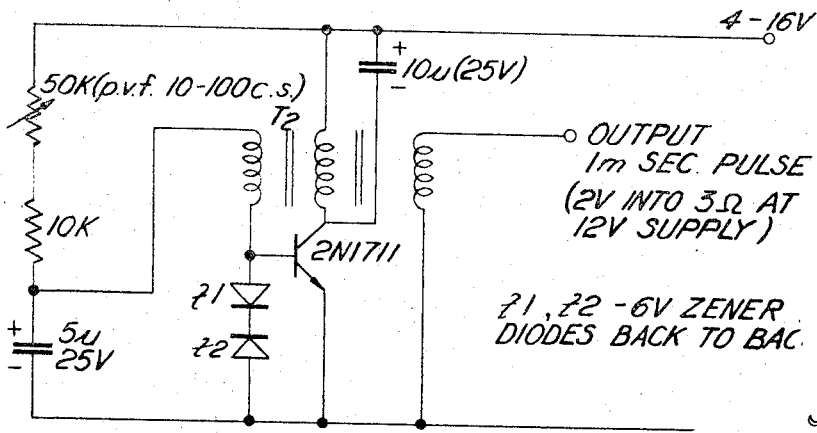

In order that the present invention may be more fully understood, reference will now be made, by way of example, to the accompanying drawings in which:

FIG. 1 is a section through the laser driver according to the present invention;
FIG. 2 is a circuit diagram of the multivibrator which provides the charging current;
FIG. 3 is a graph of the voltage waveform applied to the laser; and
FIG. 4 is a graph of the measured light output waveform of the laser.
FIG. 5 is a section through a modified laser driver according to the present invention;
FIG. 6 is a circuit diagram of the laser driver shown in FIG. 5;
FIG. 7 is a circuit diagram of the high voltage supply circuit; and
FIG. 8 is a circuit diagram of the transducer drive oscillator.

Referring to FIG. 1, C consists of two 0.01 $\mu$f. disc type capacitors with the outer coating removed to enable them to be soldered directly, side by side, between the brass body B and a beryllium copper spring ½" wide x 0.004" thick. This spring is fastened to the body B by a 0.004" mica spacer and nylon screws N, the free end of the spring having attached thereto a molybdenum contact and a small bar of soft iron. The latter in conjunction with the electromagnet M serves to make and break the contact. A molybdenum screw S supported in a mica insulated bush allows adjustment of the contact spacing. The laser L is connected between S and B thereby completing the electrical circuit and is orientated as shown so that the total light emission may be utilised.

FIG. 2 shows the transistor multivibrator circuit which is driven from two 9 v. dry batteries and which provides the current for charging the capacitor C and the pulses for the electromagnet M. The frequency of the multivibrator is tuned to the resonant frequency of the contact spring by means of adjusting the 20K ohm potentiometer. The transformer T is a 15-0-15 volt miniature mains transformer whose 230 volt winding is connected to the voltage doubler network and via the 100K ohm resistor to the pulse generator capacitor C. At a pulse repetition rate of about 50 c./s. the charging voltage is 300 v. and the mean charging current is 300 $\mu$a. A suitable pulse for triggering an oscilloscope is obtained from the 15 pf. capacitor connected to the negative charging line. When the trigger output is terminated with a 50 ohm resistor the pulse is 10 nanoseconds long and +15 volts amplitude.

The voltage waveform across the laser is shown in FIG. 3. It is difficult to measure the peak current exactly because neither the resistance of the laser at such high currents nor the phase relationship between the observed voltage and the current is known. However, from FIG. 3, the resonant frequency of the circuit is estimated to be about 36 mc./s. so we may estimate the total stray inductance from:

$$f_\mathrm{r} = \frac{1}{2LC}$$

so that        $L = 10^{-9}$ henries
The current at a time $t$ is given by the formula, $$i = \frac{V_\mathrm{e}}{\omega L} - \frac{Rt}{2L} \sin \omega t$$

and will be a maximum at $t = 1/4F$ sec. i.e.

$$i_\mathrm{pk} = V \frac{C}{L} e - \frac{Rt}{2L}$$

Putting in the values $V = 300$ volts, $R = 0.1$ ohm (an average value) $t = 7$ns., $L = 10^{-9}H$, we find that
$i_\mathrm{pk} = 950$ amps This represents a maximum value since losses in the circuit such as skin effect and contact resistance will reduce this figure.

In FIG. 5 is shown a section through a modified laser driver according to the present invention. A brass disk A approximately 2″ in diameter has ten circular cavities in its lower face disposed radially around the perimeter. Into each cavity is soldered one electrode of a 0.01 μf. disk-type capacitor B. A circular beryllium copper diaphragm C, 0.002″ thick, sandwiched between two thin polythene sheets is clamped to the disk by the brass ring D. The diaphragm, isolated from its supports by the polythene, is connected to the second electrode of the capacitors by pressure from the grub screws E via a polytetrafluoroethylene disk between the grub screws and diaphragm. Five radical slats are cut in the diaphragm to render it more flexible and at its centre is attached a molybdenum contact F, the extension of which is bonded to a transducer made from the moving coil elements G of a miniature loudspeaker with the cone removed. A molybdenum screw H passing through an insulated bush in the disk A forms the other electrode and makes connection to the laser I by means of the spring J. FIG. 6 shows the equivalent circuit, the contacts being represented by the switch S. A transistor oscillator and rectifier shown in FIG. 7 is used to generate a DC voltage, variable between 100 and 600 v., to charge the capacitors through the 39 kilohm resistor. The contacts are closed by applying a 1 msec. current pulse, derived from the transistor blocking oscillator shown in FIG. 8, to the transducer. The pulse frequency may be varied between 10 and 100 c./s. Insufficient resistance is presented by the laser to critically damp the circuit so the diode D is connected as shown to short circuit the high reverse voltage swing.

It is not difficult to drive GaAs lasers at room temperatures and the apparatus herein described is very compact. The disadvantage of room temperature operation compared to a cooled laser are, firstly, the low mean power and, secondly, the very short light output pulse. In the present system the electrical path between the laser and the capacitor is designed to have a very low inductance resulting in a current risetime of a few nanoseconds. The system is compact and relatively efficient as all the energy in the capacitor is dissipated in the laser itself. Suitable design of the pulse generator together with an effective heat sink for the laser should enable the pulse repetition frequency to be increased to a few kilocycles.

I claim:

1. A pulse supply for lasers operable at room temperatures comprising:
   a laser,
   low inductance capacitor means,
   a low inductance electrical path connecting said laser to said capacitor means and including switching means for rapidly making and breaking repeatedly the said path between said laser and capacitor means to discharge said capacitor means through said laser, and
   means coupled to said capacitor means for repeatedly charging said capacitor means.

2. A pulse supply for lasers operable at room temperatures comprising:
   a laser,
   low inductance capacitor means,
   a low inductance electrical path connected between said laser and said capacitor means and including switching means,
   electromagnetically driven reed means for operating said switching means and for rapidly making and breaking repeatedly the said path between said laser and capacitor means to discharge said capacitor means through said laser, and
   means coupled to said capacitor means for repeatedly charging said capacitor means.

3. A pulse supply for lasers operable at room temperatures comprising:
   a laser,
   low inductance capacitor means,
   a low inductance electrical path connected between said laser and said capacitor means and including switching means for rapidly making and breaking repeatedly the said path between said laser and said capacitor means to discharge said capacitor means through said laser, and
   transistor multivibrator means connected to said capacitor means for repeatedly charging said capacitor means.

4. A pulse supply for lasers operable at room temperatures comprising:
   a laser,
   low inductance capacitor means,
   a low inductance electrical path connected between said laser and said capacitor means and including switching means,
   electromagnetically driven reed means for operating said switching means for rapidly making and breaking repeatedly the said path between said laser and capacitor means to discharge said capacitor means through said laser, and
   transistor multivibrator means coupled to said capacitor means for repeatedly charging said capacitor means and for supplying pulses to the electromagnet of said reed means.

5. A pulse supply according to claim 4 wherein the frequency of said multivibrator means is variable so that it may be tuned to the resonant frequency of said reed means.

6. A pulse supply for lasers operable at room temperatures comprising:
   a laser,
   low inductance capacitor means,
   a low inductance electrical path connected between said laser and said capacitor means and including switching means,
   acoustic transducer means including a moving coil element,
   diaphragm means located so as to operate said switching means and connected to the moving coil element of said acoustic transducer means for rapidly making and breaking repeatedly the said path between said laser and said capacitor means to discharge said capacitor means through said laser, and
   means coupled to said capacitor means for repeatedly charging said capacitor means.

7. A pulse supply for lasers operable at room temperatures comprising:
   a laser,
   low inductance capacitor means,
   a low inductance electrical path connected between said laser and said capacitor means and including switching means,
   acoustic transducer means including a moving coil element,
   diaphragm means located to operate said switching means and connected to the moving coil element of said transducer means for rapidly making and breaking repeatedly the said path between said laser and said capacitor means to discharge said capacitor means through said laser, and
   transistor oscillator and rectifier means associated with said capacitor means for repeatedly charging said capacitor means.

8. A pulse supply for lasers operable at room temperatures comprising:
   a laser,
   low inductance capacitor means;
   a low inductance electrical path connected between said laser and said capacitor means and including switching means;

acoustic transducer means including a moving coil element;

diaphragm means located to operate said switching means and connected to the moving coil element of said transducer means for rapidly making and breaking repeatedly the said path between said laser and said capacitor means to discharge said capacitor means through said laser, and transistor oscillator and rectifier means associated with said capacitor means for repeatedly charging said capacitor means and associated with said transducer for supplying pulses thereto.

9. Improved laser drive comprising transistor multivibrator means for repeatedly charging low inductance capacitor means together with a low inductance path between said capacitor means and the laser including low inductance contact means operated by the oscillations of electromagnetically driven reed means to provide intermittent connection between said capacitor means and said laser the pulses for the electromagnet being derived from the transistor multivibrator.

10. Improved laser drive according to claim 9 wherein the frequency of the transistor multivibrator means is variable so that it may be tuned to the resonant frequency of said reed means.

11. Improved laser drive comprising means for repeatedly charging low inductance capacitor means together with a low inductance path between said capacitor means and the laser including low inductance contact means operated by the oscillations of diaphragm means bonded to the moving coil element of acoustic transducer means to provide intermittent connection between said capacitor means and said laser.

12. Improved laser drive comprising transistor oscillator and rectifier means for repeatedly charging low inductance capacitor means together with a low inductance path between said capacitor means and the laser including low inductance contact means operated by the oscillations of diaphragm means bonded to the moving coil element of acoustic transducer means to provide intermittent connection between said capacitor means and said laser.

13. Improved laser drive comprising transistor oscillator and rectifier means for repeatedly charging low inductance capacitor means together with a low inductance path between said capacitor means and the laser including low inductance contact means operated by the oscillations of diaphragm means bonded to the moving coil element of acoustic transducer means driven by pulses derived from transistor oscillator means applied to said acoustic transducer means to provide intermittent connection between said capacitor means and said laser.

References Cited
UNITED STATES PATENTS

| | | | |
|---|---|---|---|
| 3,258,596 | 6/1966 | Green | 250—199 |
| 3,320,559 | 5/1967 | Morrison | 335—151 |

BERNARD KONICK, *Primary Examiner.*

JOSEPH F. BREIMAYER, *Assistant Examiner.*

U.S. Cl. X.R.

335—148, 91; 307—317